Dec. 24, 1929.　　　E. WANDERSLEB ET AL　　　1,740,529
SUNSHADE FOR PHOTOGRAPHIC OBJECTIVES
Filed Oct. 19, 1927

Patented Dec. 24, 1929

1,740,529

UNITED STATES PATENT OFFICE

ERNST WANDERSLEB AND HUGO KUNZE, OF JENA, GERMANY, ASSIGNOR TO FIRM OF CARL ZEISS, OF JENA, GERMANY

SUNSHADE FOR PHOTOGRAPHIC OBJECTIVES

Application filed October 19, 1927, Serial No. 227,329, and in Germany October 23, 1926.

The present invention relates to a sunshade for photographic objectives, the mounts of which project from the lens panel of the camera. The sunshade consists of a bell-shaped body which may be slipped over the front part of the objective mount. The body has accordingly two apertures of different diameter, of which the diameter of the smaller aperture is adapted to that of the front part of the objective mount, so that the sunshade, slipped with this aperture over the said part of the mount, sticks to the mount owing to the friction existing between both parts. In this position in which the sunshade projects from the objective mount towards the object to be photographed, luminous rays, emerging obliquely from above from the sun or from another source of light, laterally disposed in front of the objective, are prevented from entering the front lens of the photographic objective and producing errors of exposure on the sensitive layer. However, owing to the bell-shaped diaphragm, which enlarges towards the object to be photographed, any undesirable vignetting of the photo to be taken will be avoided.

In contrast to this described operative position the sunshade may assume a second position on the objective in which it serves as an objective-protector, i. e., as a protection against injury to the part of the mount projecting from the lens panel. This latter position is attained if the larger aperture of the bell-shaped body encloses the rear part of the mount, adjacent to the lens panel, while simultaneously the smaller aperture is again slipped over the front part of the mount. In order to attain this second position of the diaphragm on the objective it is necessary that the diameter of the said larger aperture corresponds to that of the rear part of the mount and its height to that of the part of the objective mount, projecting from the lens panel.

The sunshade may consist of any desired suitable material. If it has been made of rigid material, e. g. metal, vulcanite, vulcanized fibre or the like, it is necessary for the passing of the sunshade from the one position into the other to rotate the diaphragm through 180° prior to slipping it again over the mount. If, however, the sunshade consists of rubber or a similar elastic material, the passing from the operative position into the other one or vice versa can take place without removing the diaphragm, once fixed on the front part of the mount, from the mount by overturning the diaphragm.

Figure 1:
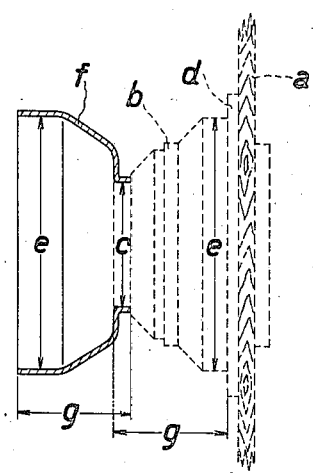
Figure 2:
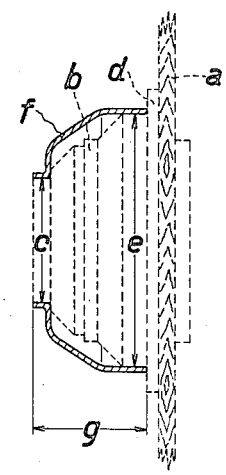

The annexed drawing shows two constructional examples of the invention in a cross section. Figs. 1 and 2 represent a sunshade of metal according to the invention in the two positions on the objective and Figs. 3 and 4 a sunshade of rubber, likewise in the two positions on the objective.

The objective is fixed at any one time in a panel $a$; the diameter of the front part of its mount $b$ is denoted by $c$, that of the rear part of the mount $b$, adjacent to the lens panel $a$, which is provided with a plate $d$ for fixing the objective on the panel $a$, is denoted by $e$.

The sunshade, shown as the first example (Figs. 1 and 2) consists of a bell-shaped body $f$ made of sheet-brass with two apertures, of which the smaller one has an inside diameter of the size of the diameter $c$, while the larger one has an inside diameter of the size of the diameter $e$. The height of the body $f$ denoted by $g$ is similar to the height of the part of the objective mount $b$, projecting from the fastening plate $d$.

In order to use the body $f$ as a sunshade it should be slipped with the smaller aperture over the front part of the mount $b$ in the position shown in Fig. 1. In this position it prevents the entrance of luminous rays into the objective, which rays emerge from sources of light laterally disposed in front of the objective. If the body $f$ be slipped over in the position shown in Fig. 2 it is used as a protection of the mount $b$. In this case its smaller aperture again embraces the front part of the mount $b$, while its larger aperture encloses the rear part of the mount $b$ with the diameter $e$ and touches the plate $d$.

The sunshade represented as the second example (Figs. 3 and 4) consists of a bell-shaped rubber body $h$ with two apertures, of which the smaller one has an inside diameter which is but little smaller than the diameter $c$ of the front part of the mount $b$. The diameter of the larger aperture corresponds to the diameter $e$ of the rear part of the mount $b$.

Figure 3:
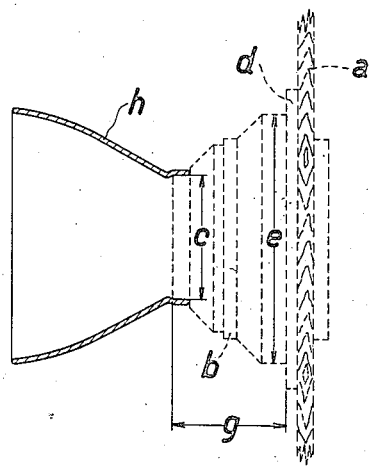
Figure 4:
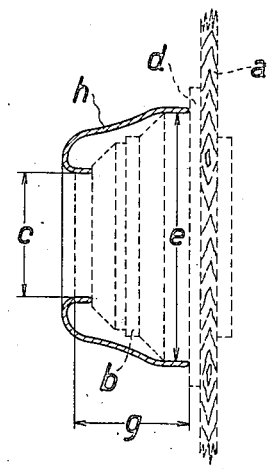

In order to use the sunshade it is necessary to slip the body $h$ in the position shown in Fig. 3 over the front part of the mount $b$, where it firmly sticks to the margin of the smaller aperture owing to the expansion of the rubber, caused by the said difference in diameter. While the body $h$ is operative in this position as a sunshade, it is possible by a simple inversion to bring it into the position shown in Fig. 4 in which it acts as a protection for the mount $b$ of the objective. The height of the body $h$ is chosen so much greater than the height $g$ of the part of the mount $b$, projecting from the lens panel $a$, that after the inversion its larger aperture comes into contact with the fastening plate $d$.

We claim:

1. Sunshade for photographic objectives, the mounts of which project from the lens panel of the camera, consisting of a bell-shaped body with a narrow and a large aperture, the diameter of the said narrow aperture corresponding to that of the front part of the objective mount and the diameter of the said large aperture corresponding to that of the rear part of the objective mount, projecting from the lens panel of the camera, the body being adapted to be slipped with the narrow aperture over the front part of the objective mount, the length of the body corresponding to the length of the part of the objective mount, projecting from the lens panel of the camera.

2. Sunshade for photographic objectives according to claim 1, made of rigid material.

ERNST WANDERSLEB.
HUGO KUNZE.